United States Patent Office 3,508,309
Patented Apr. 28, 1970

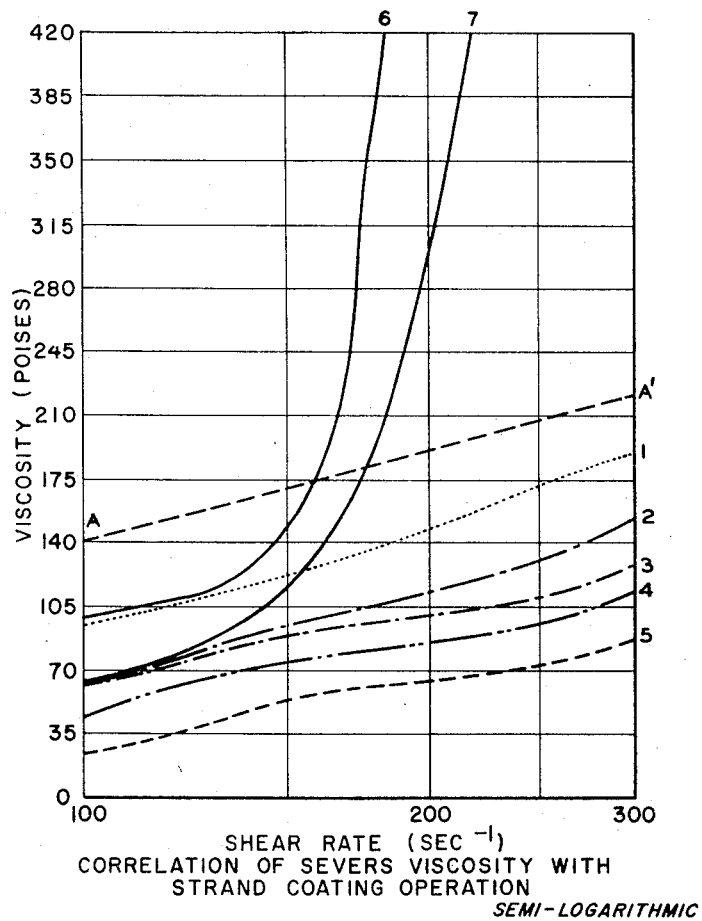
CORRELATION OF SEVERS VISCOSITY WITH
STRAND COATING OPERATION
*SEMI-LOGARITHMIC*
ADRIEN E. BEAUDOIN,
ALBERT E. JANNARELLI
& ALFRED MARZOCCHI
*INVENTORS*

3,508,309
METHOD OF COATING GLASS FIBERS AND THE LIKE
Adrien E. Beaudoin, Northboro, Mass., and Albert E. Jannarelli and Alfred Marzocchi, Cumberland, R.I., assignors to Owens-Corning Fiberglas Corporation, a corporation of Delaware
Continuation-in-part of application Ser. No. 553,246, May 26, 1966, which is a continuation-in-part of application Ser. No. 153,630, Nov. 20, 1961, which in turn is a continuation-in-part of application Ser. No. 819,993, June 12, 1959. This application Feb. 26, 1968, Ser. No. 708,350
Int. Cl. C03c 25/02; C08f 45/28; D02g 3/36
U.S. Cl. 28—73                                3 Claims

ABSTRACT OF THE DISCLOSURE

A method of producing thick protective coatings on glass fibers and the like wherein resin particles coated with at least 2 percent of a nonionic surfactant are mixed with a hydrocarbon solvent and a plasticizer for the resin, to cause the nonionic coating to be swollen by the hydrocarbon in which it is only partially solvated. The materials are mixed at a temperature below approximately 100° F. in order that the swollen coatings are not broken down, and in order that the coatings will prevent the mixing of the plasticizer and the resin. The material is then applied to glass fibers and the coated fibers are pulled through forming dies. The swollen coatings on the resin particles prevent buildup of viscosity, during passage through the forming dies. The coated fibers are heated to evaporate the solvent and break down the swollen coatings to allow mixing of the plasticizer and resin. The coated strands are then woven and the coated fibers fused together to set the weave. Fly screening is produced in this manner.

CROSS REFERENCES TO RELATED APPLICATIONS

The present application is a continuation-in-part of copending application Ser. No. 553,246, filed May 26, 1966, now abandoned, which in turn is a continuation of Ser. No. 153,630, filed Nov. 20, 1961, and now abandoned, which in turn is a continuation-in-part of application Ser. No. 819,993, filed June 12, 1959, now abandoned.

BACKGROUND OF THE INVENTION

This invention relates to glass fiber yarns and more particularly relates to glass fiber yarns provided with a coating of synthetic, organic resinous material, which yarns are particularly well adapted for use as insect screening materials.

In the manufacture of screening, glass filaments are twisted and piled into a glass core that retains the outstanding qualities of pure glass, and a coating of a liquid resin having specific and critical properties is thereafter applied to the yarn and fused around the filaments. The resin is applied to the continuous yarn by means of a suitable immersion, contact or spray application step, and the yarn and resin are extruded through a die which wipes the liquid resin around the yarn and forms a rounded, continuously coated yarn and the coated yarn is then passed through a heated zone to fuse the resin. The coated glass yarn is then woven into a screen cloth and fused in the woven relationship to provide an integral, open mesh fabric which shows decided advantages over customary screening in improved impact resistance, rust and corrosion resistance, fire and heat resistance, dimensional stability, and ease of installation.

The resinous material to be used for coating the glass yarn must be capable of being applied to the glass yarn in liquid form and coated on and around the filaments by means of an extrusion die to provide a coating which is continuous, completely envelops the glass filaments and yields a highly cylindrical or rounded yarn. Additionally, the coating should fuse to a tough, flexible film, which is resistant to abrasion, wear, aging and chemical action. Plastisol compositions would appear to be excellent candidate coating materials insofar as they have many of the desirable characteristics especially adaptable for the continuous coating of yarn. However, attempts to coat glass yarn with various conventional plastisol systems now available have resulted in frequent failures, primarily due to the failure of the specific plastisol to satisfactorily coat the yarn or, in some cases, in the characteristics of the resultant coating. Commercially available plastistol systems or conventional modifications thereof, did not readily adapt themselves to a system whereby glass yarns could be continuously coated by means of an extrusion die and thereafter passed through a curing oven wherein the vinyl coating could be fused to a tough, flexible, continuous coating completely enveloping the glass yarns.

An obect of the present invention is the provision of a coating composition which does not thicken appreciably on standing or upon being subjected to shear.

It is therefore a primary object of this invention to devise coating formulations specifically adapted for the continuous coating of glass yarns.

It is another object to provide coatings which, on heating, will fuse to a tough, flexible film, which is chemically resistant, abrasion resistant, and resistant to wear and aging.

It is still another object to provide a coating composition which will fuse to a tough, flexible, continuous film in and around glass yarns at elevated temperatures and which is adaptable for continuous application to the yarns in liquid form by means of an extrusion die.

A more specific object is the provision of a stabilized plastisol wherein particles of a plastic are surrounded by a surfactant which is swollen by an organo solvent to retard penetration by a plasticizer.

SUMMARY OF THE INVENTION

According to the invention, it has been discovered that a coating of nonionic surfactant on resin particles, when present in more than approximately 2 percent is swollen but not removed by a hydrocarbon solvent. The lipophilic portion of the surfactant molecules are oriented to the resin with the hydrophilic portion projecting outwardly. The hydrophilic portion of the molecule is only slightly solvated by hydrocarbon solvent and so becomes swollen into a thick protective layer which prevents plasticizers from being mixed with the resin even during extreme shearing action. The coating process used is performed by mixing surfactant coated resin particles with hydrocarbon solvents and plasticizers at a temperature below approximately 100° F. to produce the thickened surfactant shells. The material is applied to glass fiber strands and pulled through dies to form uniform coatings, following which the hydrocarbon solvent is evaporated to destroy the shells and cause the coating to thicken. The surfactant migrates to the surface of the strand where it provides a protective lubricating coating that is helpful in the weaving of the coated strand. The woven strand is then further heated to fuse the coatings and set the weave. Fly screening is produced in this manner.

BRIEF DESCRIPTION OF THE DRAWING

FIGURE 1 illustrates viscosity-shear rate curves of various plastisol formulations.

DESCRIPTION OF THE PREFERRED EMBODIMENTS

In accordance with the practice of this invention, fibrous glass yarns are coated with plastisol compositions comprising 100 parts by weight of polyvinyl chloride resin and a plasticizer system containing at least 40 parts by weight of any conventional plasticizer as for example those of the following group:

butylisodecyl phthalate
tri (2 ethyl hexyl) phosphate
n octyl n decyl adipate
alkyl epoxy stearate
n octyl n decyl phthalate The formulation of the resin and plasticizer system is of extreme importance in that a satisfactory plastisol is not obtained unless the plasticizer system is present in a ratio of at least 40:100 parts by weight of plasticizer to resin. This aspect will be discussed later in greater detail, in conjunction with the illustrative subject matter embodied in FIGURE 1.

The necessity for the specific plastisol formulations of the invention and for the ratio of resin to plasticizer, is dictated by the set of properties which must be exhibited by the plastisol during the coating operation and the ultimate qualities which must be realized in the finished product. In the first instance, the viscosity of the plastisol must be such that it will adhere to and continuously coat the yarn during the coating and extrusion phase. Secondly, once such a system is derived, it must fulfill a further requisite in that the viscosity of the system must be resistant to increases which are normally caused by the shear effect which is occasioned by the extrusion step. To further complicate the problem additional considerations prevail throughout both the formulation of the basic system to yield a coatable medium, and the modification of such a system to prevent shear inspired detrimental effects. These additional considerations comprise the ultimate properties of the coating, such as weather, age and heat resistance and the ability of the coating operations such as the fusion of the coating upon the strand, the weaving of the coated strand to form a fabric and a second fusion of the coating to adhere the strands in the woven relationship.

In addition, it has been found that it is desirable to employ the plasticizer system in an amount equal to no more than a coating of superior durability. However, when fillers are utilized greater quantities of plasticizer are necessitated by the tendency of the fillers to absorb the plasticizers. Furthermore, when some degree of durability may be sacrificed, a greater quantity of plasticizers may be employed, regardless of the presence of fillers.

We have found that the plasticsol compositions of this invention are particularly well adapted for coating continuous yarns of glass fibers. The plastisols are liquids which may readily be applied to the yarns just prior to passing the coated yarns through an extrusion die, maintain a continuous film formation after passage through the die, and on passing the thus coated yarns through an oven at an elevated temperature of about 350° F., the plastisols are fused to a tough, flexible film which is resistant to chemicals and aging and provides improved impact resistance in screening woven from the coated yarns.

It has been found that the ability of a plastisol to provide viscosity characteristics adequate for the adherence or pick up of a continuous coating, and to resist the harmful effects of shear forces created by extrusion, results when the resin particles are coated with a nonionic surfactant in an amount comprising more than 2 percent of the coated resin, and surfactant plasticizer is used to swell this coating and inhibit a plasticizer of the resin from reaching the resin. It has also been found that viscosity-shear rate curves serve to indicate the ability of a plastisol to yield the specified characteristics of viscosities which permit the application of the coating, and a shear resistance which permits the maintenance of the coating in a suitable condition, as well as demonstrating the necessity for an adequate ratio of plasticizer to resin. Referring now to FIGURE 1 of the drawing, it has been found that the plastisol compositions of the invention must have viscosity-shear rate curves which fall below the straight line A—A' which is defined by a point representing a viscosity of 140 and a shear rate of 100 and a second point which represents a viscosity of 220 and a shear rate of 300. The extrusion die used for the application of the plastisols has a close tolerance in order to yield a rounded yarn which is completely enveloped by the resin. This close tolerance and the fact that the yarns are preferably coated at rates greater than 450 feet per minute, produced excessive shear conditions and shear rates which have prevented prior art materials from being applied satisfactorily in a continuous coating which is free from defects. It has been determined that when the viscosity-shear rate curves of the plastisols extend above the line A—A', the material will either fail to coat the strand or will yield a coating which is characterized by many coating defects or uncoated areas. It has been further found that the achievement of suitable plastisols having viscosity-shear rate curves which fall below the line A—A' is a direct result of providing protective shells around the particles of resin.

The desirable plastisols illustrated by the broken line curves 1 through 5 of FIGURE 1, comprise plastisols having a plasticizer content of between 47–50 parts of plasticizer for each 100 parts of polyvinyl chloride resin and include resin particles coated with a surfactant that is swollen by a solvent. The plastisols which yielded curves 1 and 2 each contained a plasticizer to resin ratio of 47:100 parts by weight. The unsatisfactory plastisols of solid line curves 6 and 7 comprised a ratio of 45:100 parts and did not include resin particles coated with an adequate layer of surfactant swollen by a solvent. Many prior art plastisols approach the criterions of the present invention, but fail to yield a proper coating. A typical prior art plastisol is the plastisol composition of U.S. 2,872,366, which gives the viscosity-shear rate curves 6 and 7 which are unsatisfactory in the prescribed coating system of the invention. Both of these curves extend above the line A—A.

All of the viscosity-shear rate curves of FIGURE 1 were obtained by means of a Severs extrusion rheometer at 25° C. and with an orifice opening of 0.3268 centimeter.

In addition to the resin, surfactant coatings, surfactant solvators, and resin plasticizers of the plastisols of the invention, the formulations may also contain such optional additives as secondary plasticizers, stabilizers, pigments, ultra violet screeners or absorbers, diluents, flame retardants and fillers.

The surfactant solvator is employed to gel or swell the coating of surfactant on the resin particles. The surfactant solvators are organic solvents, and therefore only partially solvate the oleophobic projecting portion of the surfactant molecules. Nonionic surfactant molecules orient themselves on the particles of plastic with the lipophilic portion of the molecule attached to the resin, and the hydrophilic portion extending around the particle as a shell. The shells are hydrophilic organo atom groupings which are lipophobic, at least to some degree. Organic solvents only partially solvate the lipophobic portion of the surfactant molecules to cause a swelling of the surfactant which increases its thickness to thereafter inhibit migration of resin plasticizers through the swollen now gelatinous surfactant coatings. By preventing the resin plasticizer from reaching the resins, the resins in turn are not swollen to any appreciable degree, or at least to an extent where the resin particles join up and form a continuous phase. The combination of surfactant and surfactant solvators therefore provides a more stable viscosity and longer shelf life, and at the same time allows the mixture to become plasticized and thick when the mixture is heated to disrupt the gelatinuous protective coatings on the resin particles. Any suitable organo solvent for the lipophobic portion of the surfactant molecules can be used, and hydrocarbons, such as petroleum fractions, are a preferred material, since the lipophobic portions of the surfactant usually only have limited solubility in these hydrocarbons. The degree of swelling, therefore, can be controlled by the type of solvent which is used, rather than depending upon the amount of solvent used. Aliphatic hydrocarbons derived from petroleum are preferred because of their controlled solubilizing effect, but aromatic hydrocarbons can also be used. Hydrocarbons are preferred since they exude to the coating surface and provide lubricity which is helpful during weaving.

Stabilizers conventionally employed with vinyl plastisols such as metallic salts may be employed. Typical stabilizers are barium, cadmium, calcium, tin, zinc, and lead salts which serve to bind free radicals and thereby prevent them from catalyzing the coating breakdown.

Suitable pigments are too numerous to mention and are adequately disclosed by the pertinent art. However, as specific examples, aluminum pastes or carbon black may be employed impart a gray hue and the latter material will provide an additional function in screening or absorbing ultra violet light. Various other colors may be achieved with various organic and inorganic dyes and pigments. As a general rule, the pigment should be kept low to avoid an effect on viscosity. Premixed commercial preparations of pigment and plasticizer are now available and may be employed within the scope of the invention which pertains to plasticizers.

While various conventional ultraviolet screeners or absorbers may be used, 2 hydroxy 4 methoxy benzophenone is a preferred additive.

While antimony oxide is a preferred flame retardant, various conventional products such as phosphate compounds are suitable.

It has also been noted that the addition of particulate fillers such as calcium carbonate, colloidal silica and the like, serves to enhance weathering characteristics.

The following example is given to more fully illustrate the concepts of the invention and represents a resin to plasticizer ratio of 100:47 parts by weight:

EXAMPLE 1

Ingredients: Parts by weight
(I) Resin—
  Polyvinyl chloride particles having a 3% coating of a nonionic surfactant _____ 100.0
(II) Primary plasticizers—
  Butyl isodecyl phthalate _____ 6.0
  Tri (2 ethyl hexyl) phosphate _____ 10.5
  N octyl n decyl adipate _____ 10.5
  Alkyl epoxy stearate _____ 5.0
  N octyl n decyl phthalate _____ 15.0
(III) Surfactant solvent—
  Aliphatic hydrocarbon _____ 7.0
  Hydrocarbon petroleum fraction having high aromatic content _____ 3.0
(IV) Other additives—
  Dibasic lead phosphate _____ 5.0
  2 hydroxy 4 methoxy benzophenone (U.V. absorber) _____ 0.5
  Aluminum paste (pigment) _____ 2.0
  Antimony oxide (flame retardant) _____ 4.0

A plastisol having the above composition is prepared by initially mixing, in a Ross mixer, 75 parts of the coated polyvinylchloride resin and the 2 parts pigment with a preblended and slurried mixture consisting of two thirds of the primary plasticizers butylisodecylphthalate, tri (2 ethylhexyl) phosphate, n octyl n decyl adipate and alkyl epoxy stearate and n octyl n decyl phthalate, 3 parts of barium-cadmium laurate stabilizer, 3 parts of the surfactant solvator which is a petroleum fraction having a high aromatic content end a molecular weight of 267, a specific gravity @ 25° C. of 0.8899 and an open cup flash point of 135° C. an initial boiling point of 508° F., an A.S.T.M. color of 1, S.U.S. viscosities of 56 at 100° F., and 35 at 210° F., a pour point of −60° F., an A.P.I. gravity of 27.5, a flash point of 270° F. (C.O.C.) and an aniline point of 112° F., .5 part of 3 hydroxy 4 methoxybenzophenone and 4 parts antimony oxide An additional 25 parts of polyvinylchloride is added in two increments, one after the initial resin mixture has completely wetted out (approximately 2 minutes), and the second increment after this has wetted out. After all the resin has been completely wetted out, the mixture is mixed for 20 minutes. A small amount of the preblended and slurried mixture may be set aside initially for viscosity adjustments. At all times during the mixing cycle the temperature of the mix is kept below 100° F. by means of cooling coils in the Ross mixer, and mixing beyond that required for complete homogeneity is to be avoided.

The remaining ⅓ of the plasticizer is separately blended and mixed for 15 minutes at which time, while the mixer continues to run, the 7 parts of aliphatic hydrocarbon having an A.P.I. gravity of 45.5, an initial boiling point of 320° F., a flash point (T.C.C.) of 105° F., and an aniline point of 112° F. is added slowly and the mixer is allowed to run an additional 2 minutes after the final addition.

The two mixes are then blended together cold and deaerated and kept at a temperature below 100° F. The blended, deaerated plastisol is then used to coat a continuous glass fiber yarn by extruding the yarn and plastisol through a round die. The yarn is flooded with the plastisol at a point just prior to the die and, on passage through the die, the plastisol is wiped in and around the yarn by the die forming a round strand having a continuous coating of plastisol completely enveloping the glass yarn. From the coating stage the yarn passes through an oven wherein the coating is fused at a temperature of about 350° F. The resultant yarn is both tough and flexible, grey in color, abrasion, heat and flame resistant, dimensionally stable and capable of being woven into screen material which is impact resistant.

The polyvinyl chloride resin used in Example 1 of this invention has a particle size of 1 to 2 microns in diameter and a coating on the particles of polyoxyethylene sorbitan monooleate comprising 3 percent by weight of the coated resin.

Examples of other plastisol compositions within the scope of the invention are as follows:

EXAMPLE 2

Ingredients: Parts by weight
(I) Resin—
  Polyvinyl chloride resin particles of Example 1 _____ 100.0

Example 2—Continued

Parts by weight (II) Primary plasticizers—
  Butyl isodecyl phthalate _____ 6.0
  Tri (2 ethyl hexyl) phosphate _____ 10.5
  N octyl n decyl adipate _____ 10.5
  Alkyl epoxy stearate _____ 21.0
(III) Surfactant solvent—
  Aliphatic hydrocarbon _____ 7.0
  Hydrocarbon petroleum fraction having high aromatic content _____ 3.0
(IV) Other additives—
  Barium-cadmium laurate _____ 3.0
  2 hydroxy 4 methoxy benzophenone _____ 0.5
  Aluminum paste _____ 2.0

EXAMPLE 3

(I) Resin—
  Polyvinyl chloride resin particles of Example 1 _____ 100
(II) Primary plasticizers—
  N octyl n decyl phthalate _____ 45
  Octyl epoxy stearate _____ 3
(III) Surfactant solvent—
  Aliphatic hydrocarbon _____ 8.0
  Hydrocarbon petroleum fraction having high aromatic content _____ 4
(IV) Other additives—
  Di basic lead phosphite _____ 3.0
  2,2'-dihydroxy-4,4'-dimethoxybenzophenone _____ 0.3
  Carbon black _____ 5.0
  Calcium carbonate _____ 4.0
  Antimony oxide _____ 2.0

As is apparent from the examples, it is not essential that all five of the operative plasticizers be contained in each plastisol system. For example, Example 2 does not contain n-octyl n-decyl phthalate and Example 3 is devoid of butylisodecyl phthalate, tri (2 ethyl hexyl) phosphate and n-octyl n-decyl adipate but contains a high concentration of n-octyl n-decyl phthalate. There must be at least one primary plasticizer having a pronounced plasticizing effect on the resin, and usually one or more other plasticizers are added to modify the effect of the primary plasticizer or to reduce the total cost of the plasticizer mixture. The viscosity of a resulting plastisol can be modified somewhat by the type of plasticizer which is used, and therefore, mixtures of plasticizers will usually be used to provide the desired final properties, at the cheapest possible cost.

Any nonionic surfactant having a lipophilic portion for attachment to the surface of the resin particles, and a hydrophilic portion for restricting passage of organo solvents to the resin, can be used. The nonionic surfactant preferably has an HLB ratio of between 4 and 16.

EXAMPLE 4

Fifty grams of a polyvinyl chloride resin having a particle size of from 1 to 2 microns and which was substantially devoid of a surfactant coating was mixed with 30 grams of polyoxethylene sorbitan monooleate. Thereafter a mixture of 30 grams of normal octyl normal decyl phthalate and 10 grams of kerosine were blended into the mixture. The viscosity of plastisol was measured in the manner above described, and had a viscosity of 450 centipoise. This material after one day's standing had a viscosity of 420 centipoise. Polyoxethylene sorbitan monooleate has an HLB (Hydrophile-Lipophile Balance) of 15.

EXAMPLE 5

The process of Example 4 was repeated using 30 grams of sorbitan monolaurate in place of the surfactant of Example 4. Sorbitan monolaurate has an HLB of 8.6. This material gave a viscosity of approximately 350 centipoise.

EXAMPLE 6

The process of Example 4 was repeated using 30 grams of sorbitan monooleate in place of the surfactant of Example 4. This material gave a viscosity of 250 centipoise after being mixed. Upon a one day's standing it had a viscosity of 220 centipoise. Sorbitan monooleate has an HLB of 413.

EXAMPLE 7

The process of Example 4 was repeated using 30 grams of the sodium salt of alkyl aryl polyether sulfonate, which is an anionic surfactant, for the nonionic surfactant of Example 4. This material upon mixing had a viscosity of 5,300 centipoise, and upon one day's standing had a viscosity of 5,350 centipose.

EXAMPLE 8

The process of Example 4 was repeated using 50 grams of dodecyltrimethyl ammonium chloride, which is a cationic surfactant, for the surfactant of Example 4. This material had a viscosity of 4,600 centipoise upon mixing.

It is believed that anionic and cationic surfactants orient differently on the surface of the resin particles than do nonionic lubricants, and that the ionic portions of the surfactants are attracted to the surface of the resin particles so that the oleophilic portion of the surfactant molecules projects outwardly. These projecting oleophilic portions attract other materials such as the surfactant plasticizers as well as the resin plasticizers, and therefore immediately cause the usual viscosity increase of the prior art unprotected resin and plasticizer combinations.

It will be apparent from the above description that any plasticizable resin such as the polyvinylacetates, polyesters, polyamides, polyacrylates, polystyrenes, polyethylenes, polypropylene, polyurethanes, etc., capable of forming plastisols with other materials, as well as B-staged thermosetting resins, such as novolacs, melamine-formaldheyde resins, urea formaldehyde resins, resorcinol formaldehyde resins, the above resins having furfural or acrolein substituted for the formaldehyde, unsaturated polyester resins, etc. can be stabilized using the surfactants and surfactant plasticizers of the present invention. While aliphatic hydrocarbons have been stated to be preferred surfactant plasticizer because the surfactants have limited solubility therein, any type of organo solvent can be used, although it may be necessary to control the concentration of the organo solvent. Surfactant solvators will usually be used in an amount between approximately 5 percent and approximately 20 percent by weight of the coated resins.

It is apparent that the present invention provides a novel composition capable of imparting unusual results as a coating material, and to the products derived from such a composition and material.

It is also obvious that various changes, alterations and substitutions may be made in the materials, methods, and products of the invention without departing from the spirit of the invention as defined by the following claims.

We claim:
1. A method of coating glass fibers and the like comprising: mixing particles of polyvinyl resin coated with more than approximately 2 percent by weight of a nonionic surfactant swollen by the addition of from 5 to 20 parts of hydrocarbon solvent, and dispersed throughout from 40 to 55 parts per 100 parts of resin of a resin plasticizer to provide a coating mixture of plasticizer having resin particles therein protected by a swollen layer of oriented surfactant, coating glass fibers with said mixture, heating the coated fibers to evaporate the hydrocarbon solvent and disrupt the swollen layers of surfactant, and fusing the plasticizer and resin together into a protective coating on the fibers.

2. The method of claim 1 wherein the coated fibers are woven together into a screening, and the coatings are fused in the woven condition to set the weave of the screening.

3. The method of claim 1 wherein the surfactant solvent is a petroleum distillate.

References Cited

UNITED STATES PATENTS 2,615,858  10/1952  Winkler _____ 260—33.6 X
3,062,758  11/1962  Rainer et al. _____ 260—34.2 X
3,067,059  12/1962  Jannarelli et al. ___ 117—126 X

OTHER REFERENCES

Penn: "PVC Technology," 1962, pp. 316–237, MacClaren and Sons, Ltd., London.

WILLIAM D. MARTIN, Primary Examiner

D. L. COHEN, Assistant Examiner

U.S. Cl. X.R.

117—27, 126; 260—33.6